(12) United States Patent
Ishikawa et al.

(10) Patent No.: US 9,621,005 B2
(45) Date of Patent: Apr. 11, 2017

(54) ROTOR OF ROTATING ELECTRICAL MACHINE

(71) Applicants: Toru Ishikawa, Tokyo (JP); Yoshiro Imazawa, Tokyo (JP)

(72) Inventors: Toru Ishikawa, Tokyo (JP); Yoshiro Imazawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 181 days.

(21) Appl. No.: 14/436,503

(22) PCT Filed: Feb. 15, 2013

(86) PCT No.: PCT/JP2013/053631
§ 371 (c)(1),
(2) Date: Apr. 17, 2015

(87) PCT Pub. No.: WO2014/125608
PCT Pub. Date: Aug. 21, 2014

(65) Prior Publication Data
US 2016/0013695 A1     Jan. 14, 2016

(51) Int. Cl.
*H02K 1/22*     (2006.01)
*H02K 3/34*     (2006.01)
(Continued)

(52) U.S. Cl.
CPC ............. *H02K 3/345* (2013.01); *H02K 3/325* (2013.01); *H02K 3/528* (2013.01)

(58) Field of Classification Search
CPC ...... H02K 21/044; H02K 3/528; H02K 1/243; H02K 1/145; H02K 2203/12
(Continued)

(56) References Cited

U.S. PATENT DOCUMENTS 4,307,314 A * 12/1981 Yamada ................. H02K 1/243
                                                          310/194
5,539,265 A *  7/1996 Harris .................... H02K 3/528
                                                          310/194
(Continued)

FOREIGN PATENT DOCUMENTS

JP          55-76681 U     5/1980
JP          60-20763 A     2/1985
(Continued)

OTHER PUBLICATIONS

International Search Report of PCT/JP2013/053631 dated May 14, 2013.

*Primary Examiner* — Thanh Lam
(74) *Attorney, Agent, or Firm* — Sughrue Mion, PLLC; Richard C. Turner

(57) ABSTRACT

There is provided a rotor of a rotating electrical machine including a pair of field core bodies that are provided so as to enclose the field coil via the insulation bobbin around which the field coil is wound, in which a claw-shaped magnetic pole extending from an outer circumferential section of the field core body in an axial direction is provided on the field core body. The insulation bobbin has a plurality of flange sections extending from the base section of the claw-shaped magnetic pole along an inner surface of the claw-shaped magnetic pole of the field core body, and a plurality of thin portions are formed in the root section of the flange section at intervals in a circumferential direction.

8 Claims, 8 Drawing Sheets

(51) Int. Cl.
*H02K 3/32* (2006.01)
*H02K 3/52* (2006.01)

(58) Field of Classification Search
USPC ......... 310/194, 263, 156.66, 156.69, 156.71, 310/156.73
See application file for complete search history.

(56) References Cited

U.S. PATENT DOCUMENTS

| | | | |
|---|---|---|---|
| 5,574,324 | A | 11/1996 | Hirama et al. |
| 8,148,864 | B2 * | 4/2012 | Yoshizawa ........... H02K 21/044 310/156.12 |
| 2005/0218744 | A1 * | 10/2005 | Nakanishi ................ H02K 3/18 310/194 |
| 2010/0320861 | A1 * | 12/2010 | Nishikawa ........... H02K 21/044 310/194 |

FOREIGN PATENT DOCUMENTS

| | | |
|---|---|---|
| JP | 02-164240 A | 6/1990 |
| JP | 07-241052 A | 9/1995 |
| JP | 09-56099 A | 2/1997 |
| JP | 2941636 B2 | 8/1999 |
| JP | 2001-136700 A | 5/2001 |
| KR | 10-2008-0021374 A | 3/2008 |

* cited by examiner

ROTOR OF ROTATING ELECTRICAL MACHINE

CROSS REFERENCE TO RELATED APPLICATIONS

This is a National Stage of International Application No. PCT/JP2013/053631 filed Feb. 15, 2013, the contents of which are incorporated herein by reference in its entirety.

TECHNICAL FIELD

The present invention relates to a rotor of a rotating electrical machine such as a vehicle alternator that is mounted in a vehicle and, particularly, to a rotor which includes an insulation bobbin around which a rotor coil is wound.

BACKGROUND ART

In the related art, a cylindrical insulation bobbin of a vehicle alternator has been proposed, in which a slit is provided in a tongue piece which extends in a direction from a base of a rotor core claw section to a claw tip and in which a rib is formed on a claw tip extension section such that local stress due to torsion produced at the time of assembly is dispersed, a crack, damage, or the like to the tongue piece is prevented, and assembling workability is improved (for example, see PTL 1).

Further, a rotor has been proposed, in which a root of a flange section of which a thickness is reduced to be about half the side wall section that forms an accommodation section of a field coil in a part of a bobbin which is similar to PTL 1 is configured to be an S-shaped bent section and high assembling properties and high work efficiency are achieved (for example, see PTL 2).

CITATION LIST

Patent Literature

PTL 1: Japanese Patent No. 2941636
PTL 2: KR20080021374A

SUMMARY OF INVENTION

Technical Problem

In recent years, narrowing of an engine room has brought about a high demand for improvement of heat resistance and durability of mounted components. A cylindrical insulation bobbin of a vehicle alternator is formed of, for example, a high heat-resistant material in which glass fillers are added to a polyamide resin in response to a demand for raising a heat resistant temperature in some cases. However, in a case of using a material of which heat resistance is improved by adding the glass filler to the polyamide resin, a drawback arises in that a crack is likely to occur at the time of work, compared to a case of using only the polyamide resin. In this case, although the rotor bobbin is used in which a slit is provided to the tongue piece such as PTL 1, in some states, it is difficult to prevent a crack, damage, or the like of the tongue piece.

The thin flange illustrated in PTL 2 brings about good flange-bending workability and is considered effective in the prevention of cracks; however, since a plurality of entire base sections of the flange sections are provided with the bending sections of which a thickness is thin and which are bent to form the S shape in a cross-section, a problem arises in that resin flowability deteriorates during molding of a bobbin, as a molded product. That is, failure occurs, in which a molding material which flows to a side wall section having a thickness obtained by considering the resin flowability clogs the S-shaped narrow path at the flange section base section. Since the narrow path is configured to have substantially the same width of the root of a plurality of flange sections provided in an outer circumferential end of the side wall section, the flowability sharply deteriorates, it is not possible to reduce manufacturing time and it is not possible to improve the productivity.

Solution to Problem

According to the present invention, a rotor of a rotating electrical machine includes: a field coil; an insulation bobbin around which the field coil is wound; and a pair of field core bodies that are provided so as to enclose the field coil via the insulation bobbin, in which the field core body has a claw-shaped magnetic pole extending from an outer circumferential section of the field core body in an axial direction. The insulation bobbin has a plurality of flange sections extending from the base section of the claw-shaped magnetic pole along an inner surface of the claw-shaped magnetic pole, and a plurality of thin portions are formed in the root section of the flange section at intervals in a circumferential direction between each other.

Advantageous Effects of Invention

According to the present invention, a plurality of discontinued thin portions are configured in a circumferential direction in the base sections of a plurality of flange sections provided in an outer circumferential end of the side wall section of the cylindrical insulation bobbin and thereby, a rotor is achieved, of which moldability of the insulation bobbin is improved without deteriorating workability when the flange section is bent and is assembled.

DESCRIPTION OF EMBODIMENTS

Embodiment 1

Figure 1:
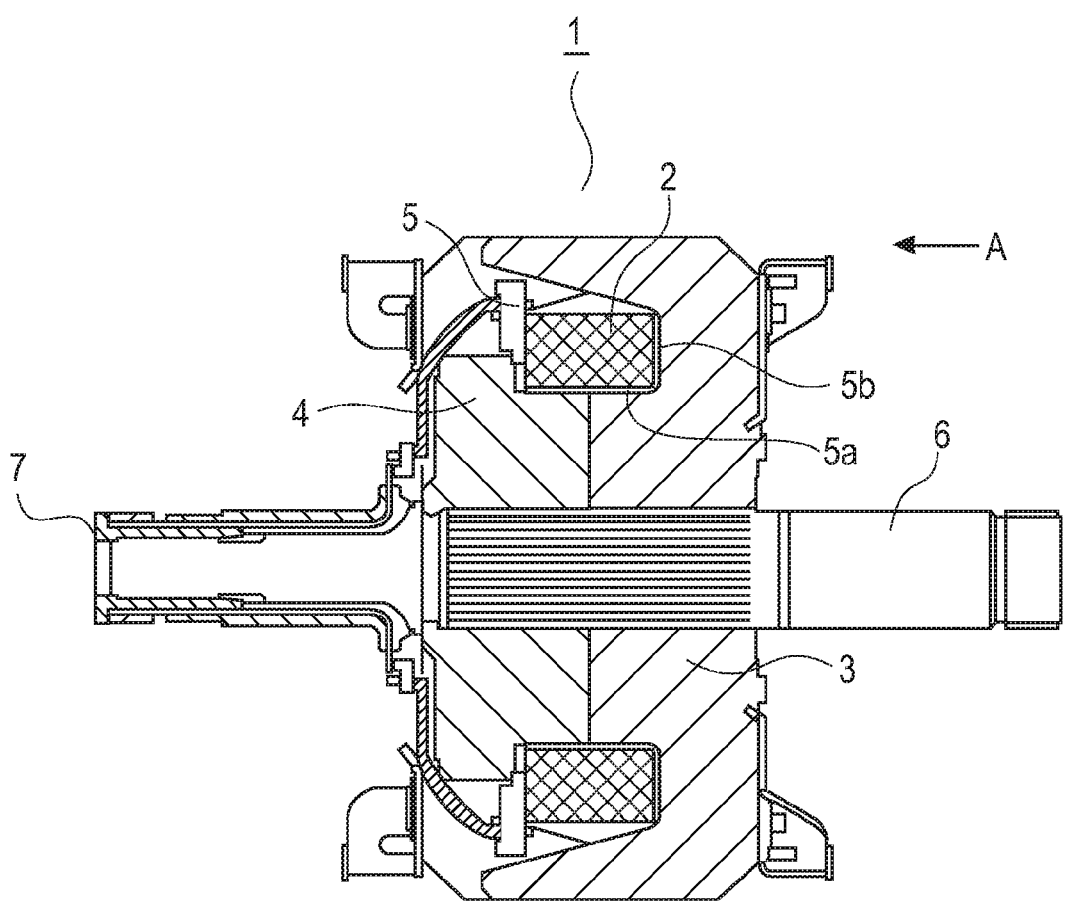
FIG. 1 is a cross-sectional view illustrating a rotor of a vehicle alternator according to Embodiment 1 of the invention.

FIG. 1 is a cross-sectional view illustrating a rotor structure of a vehicle alternator according to Embodiment 1 of the invention. A rotor 1 is configured to have a field coil 2 that generates a magnetic flux and a pair of field core bodies 3 and 4 provided so as to enclose the field coil 2 via an insulation bobbin 5. The field core body 3 and field core body 4 described above have claw-shaped magnetic poles 3a and 4a extending from an outer circumferential section in an axial direction, respectively. Front end portions of the claw-shaped magnetic poles 3a and 4a are disposed so as to engage with each other in the circumferential direction. The field coil 2 described above is wound around the insulation bobbin 5. Similar to the field core bodies 3 and 4, a slip ring ASSY 7 which is fitted to a shaft 6 is provided to supply a current to two slip rings from the outside via a brush (not illustrated).

Figure 2:
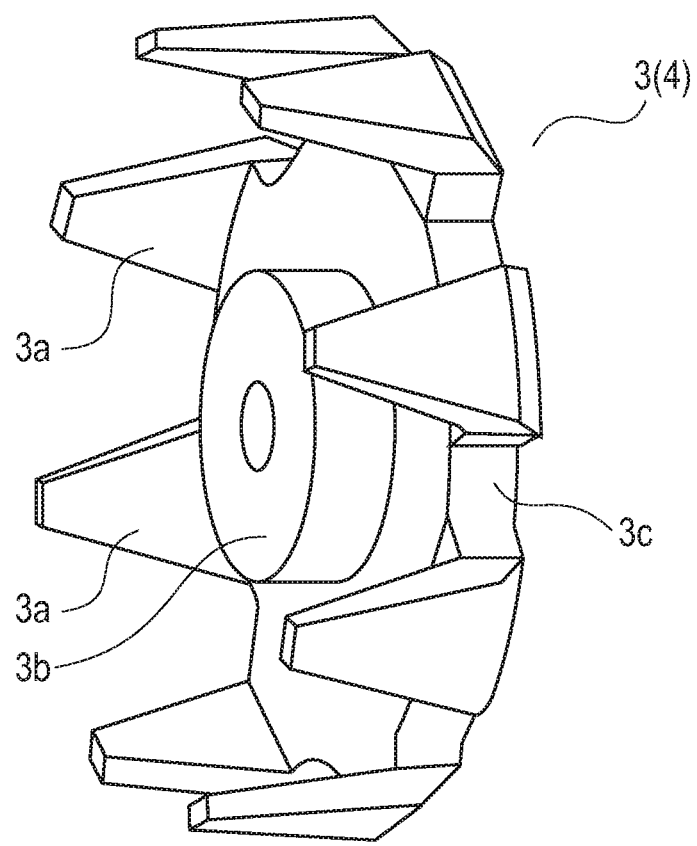
FIG. 2 is a perspective view illustrating one of a pair of field core bodies in FIG. 1 which is extracted.

The field core bodies 3 and 4 are configured to have, as one (field core body 3) alone illustrated in FIG. 2, a plurality of claw-shaped magnetic poles 3a, a cylindrical section 3b which is a fitting portion to the shaft 6, and a side plate section 3c which links the claw-shaped magnetic poles 3a and the cylindrical section 3b. The field core body 4 has entirely the same configuration as the field core body 3 when the set-up direction becomes reversed. The insulation bobbin 5 around which the field coil 2 is wound is held by an outer circumference of the cylindrical section 3b (4b) of the field core body 3 (4) and an inner surface of the side plate section 3c (4c).

Figure 3:
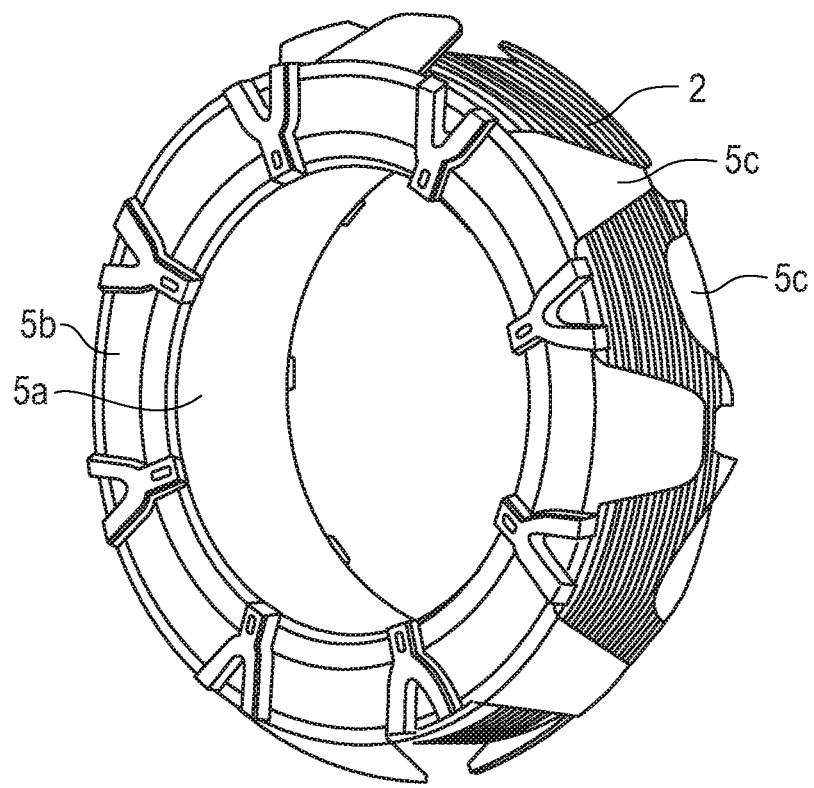
FIG. 3 is a perspective view illustrating a mounted state of the insulation bobbin in FIG. 1.
Figure 4:
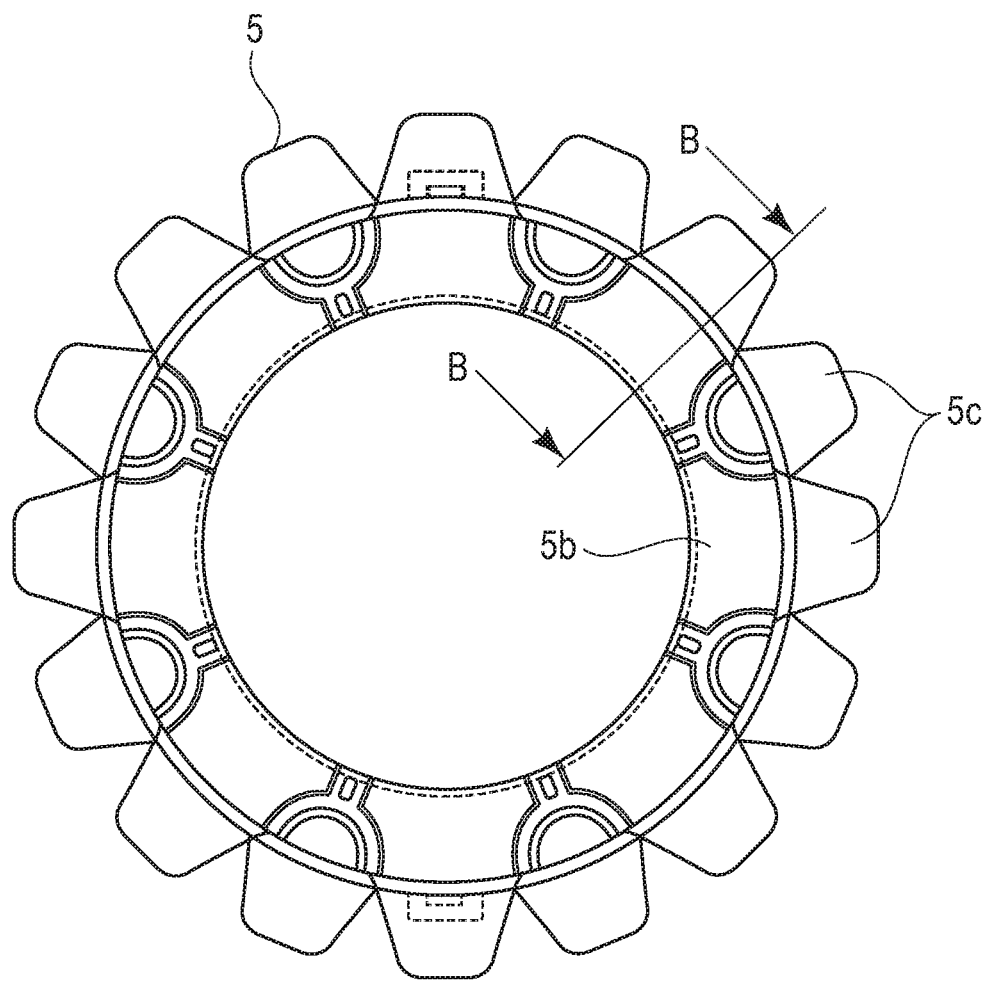
FIG. 4 is a side view illustrating the insulation bobbin in FIG. 1 before assembling when viewed from arrow A.

As illustrated in FIG. 3 and FIG. 4, the field coil 2 is wound around a concave section that is configured of a cylindrical section 5a and a side wall section 5b in the insulation bobbin 5. Flange sections 5c corresponding to the claw-shaped magnetic pole 3a (4a) are provided on the outer circumferential end of the side wall section 5b of the insulation bobbin 5. The flange sections 5c cover the outer circumference of the field coil 2 as illustrated in FIG. 3 when the insulation bobbin 5 is mounted in the field core body 3 (4), are bent from a circumferential surface of the base section inward toward the axis, and are configured along the inner circumference of the claw-shaped magnetic pole 3a (4a). Accordingly, it is possible to secure insulation properties between the outer circumference of the field coil 2 and the inner circumference of the claw-shaped magnetic pole 3a (4a).

The insulation bobbin 5 is obtained by molding a resin having the insulation properties. During the molding, the plurality of flange sections 5c arranged in a radial direction as illustrated in FIG. 4 are molded into shapes bent outward from the axis at outward bent places 8 on the root circumferential surface. This molding is mostly employed in the related art such that buffering of collision with a manufacturing nozzle (not illustrated) which unwinds a coil line is avoided when the field coil 2 is wound around the cylindrical section 5a of the insulation bobbin 5 which is a process after the molding. This is only needed for the winding process and thus, after the insulation bobbin 5 is assembled into the field core bodies 3 and 4, the flange sections 5c maintain shapes without a crack or a cleft at the places in a state of outward bending to the extent that the flange sections 5c may be unbent. In addition, the outward bent places 8 have room such that the outermost circumference of the wound field coil 2 does not escape from the space and is provided slightly outward in the radial direction from the outer circumferential end of the side wall section 5b.

After the field coil 2 is wound around the cylindrical section 5a of the insulation bobbin 5, the insulation bobbin 5 is assembled into and along the inner circumference of the claw-shaped magnetic poles 3a and 4a of the field core bodies 3 and 4; however, the flange section 5c is bent inward to the axis from the circumferential surface of the base section and is positioned along the inner circumference of the claw-shaped magnetic poles 3a (4a) as described above.

Figure 5:
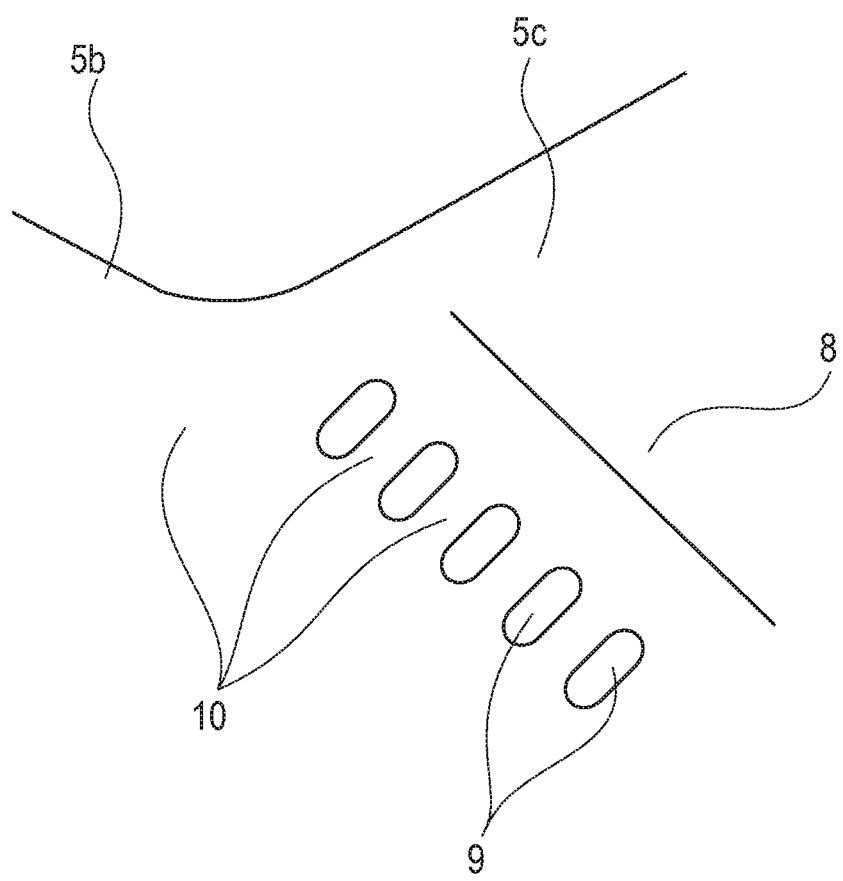
FIG. 5 is a partially enlarged perspective view illustrating an extracted part of a flange section in FIG. 4.
Figure 6:
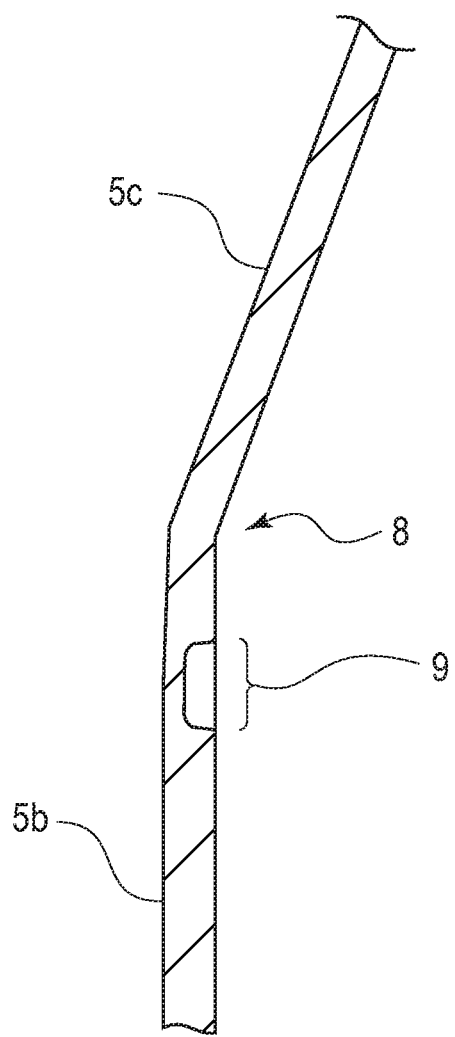
FIG. 6 is a cross-sectional view taken along line B-B in FIG. 4.
Figure 7A:
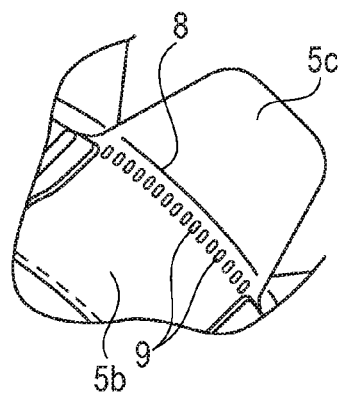
FIGS. 7A-7D show partially enlarged plan views illustrating embodiments related to an aspect of forming a thin portion according to an embodiment of the invention.
Figure 7B:
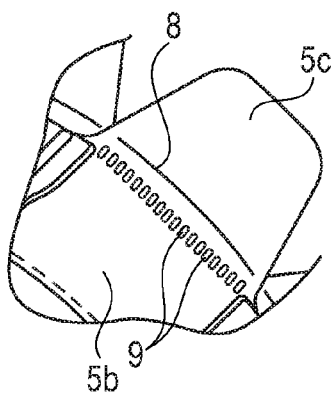
Figure 7C:
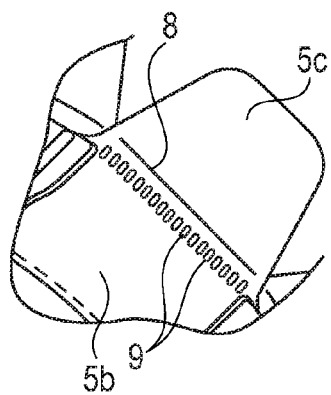
Figure 7D:
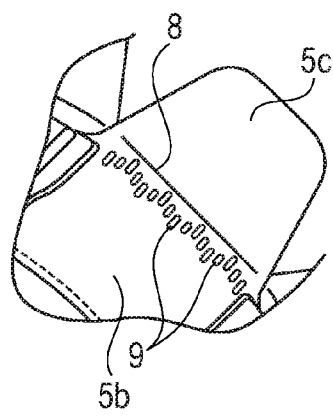

As illustrated in FIG. 5, a plurality of thin portions 9 are provided between the outward bent places 8 and the outer circumferential end of the side wall section 5b at intervals between each other in the circumferential direction. As illustrated in FIG. 6, the thin portions 9 are recessed so as to have less thickness on the outer side of the side wall section 5b of the insulation bobbin 5 and the thickness becomes about equal to or less than half the thickness of a portion around. Since spaces 10 between the thin portions 9 adjacent in the circumferential direction have the same thickness as that of a portion around, a length of the space 10 between the thin portions 9 is secured to some extent and thereby, it is possible to avoid clogging with the resin flow during the molding.

As illustrated in FIG. 5, each of the thin portions 9 has, for example, a race track-shaped ellipse and thereby, the resin flow is not hindered during the molding. In addition, since the plurality of thin portions 9 are discontinued within the width of the base section of the flange section 5c, that is, the width of the thin portion 9 in the circumferential direction itself is provided to be very small, a product which has both appropriate bending workability and molding resin flowability by the thinness is obtained.

Similar to that in the related art, the flange section 5c is thinner than the cylindrical section 5a and the side wall section 5b which are sections around which the field coil is wound; however, it is preferable that the thickness changing position is configured around the thin portion 9 gently. As understood in FIG. 6, the thickness is gradually changed before the outward bent places 8 of the thin portions 9, that is, around the outer circumferential surface of the side wall section 5b. The thickness is changed gradually and thus, it is effective to exclude a starting point of a crack.

Embodiment 2

The thin portions 9 and the outward bent places 8 described above are arranged in an arc corresponding to the outer circumferential end of the side wall section 5b as illustrated in FIG. 7(*a*); however, the configuration is not limited thereto and hereinafter, another example according to the embodiment of forming the thin portions 9 will be described.

FIG. 7(*b*) illustrates examples that are a state in which the thin portions 9 shown in Embodiment 2 are formed, the thin portions 9 are arranged in a chordal shape, and the outward bent places 8 are arranged in an arc.

Embodiment 3

In addition, as illustrated in FIG. 7(*c*), both the thin portions 9 and the outward bent places 8 may be arranged in a chordal shape.

Embodiment 4

Further, the plurality of thin portions 9 do not have to be arranged in a line so as to be adjacent, but, when the thin portions 9 are arranged randomly in the radial direction as in an example illustrated in FIG. 7(*d*), it is anticipated that high flexibility in the bending of the flange sections is achieved. Here, even in the arrangement in FIG. 7(*d*), there is a need to configure the thin portions to face the inner circumferential root section of the claw-shaped magnetic poles 3a and 4a.

Embodiment 5

Figure 8:
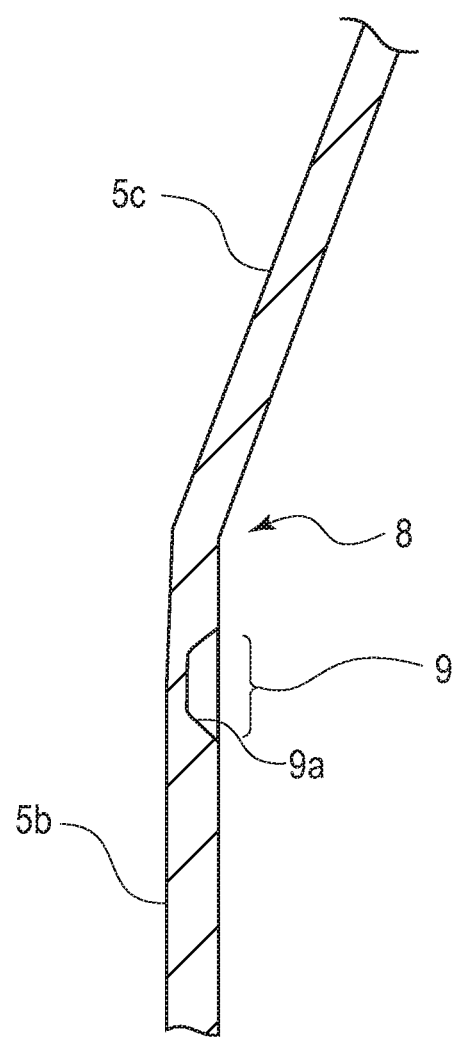
FIG. 8 is a cross-sectional view taken along line B-B in FIG. 4 illustrating an example in FIG. 6.

In addition, needless to say, the thickness of the thin portion, the race track-shaped ellipse, or the like is an example, and may be configured to have the same shape with which the same effect is obtained. The cross-sectional shape of the thin portion 9 is not only the simple concave shape illustrated in FIG. 6, and a configuration in which a slope 9a is provided to have a boundary which becomes narrower to the bottom as illustrated in FIG. 8 may improve the flowability more.

The invention claimed is:

1. A rotor of a rotating electrical machine comprising:
a field coil;
an insulation bobbin around which the field coil is wound; and
a pair of field core bodies that are provided so as to enclose the field coil via the insulation bobbin, wherein
the field core body has a claw-shaped magnetic pole extending from an outer circumferential section of the field core body in an axial direction, and
the insulation bobbin has a plurality of flange sections extending from the base section of the claw-shaped magnetic pole along an inner surface of the claw-shaped magnetic pole, and a plurality of thin portions are formed in the root section of the flange section at intervals in a circumferential direction between each other.

2. The rotor of a rotating electrical machine according to claim 1, wherein
spaces between the plurality of thin portions in the circumferential direction are configured to have the same thickness as a side wall section.

3. The rotor of a rotating electrical machine according to claim 1, wherein
the plurality of thin portions are formed by causing the outer side of a side wall section of the insulation bobbin to be recessed so as to be thin.

4. The rotor of a rotating electrical machine according to claim 1, wherein
the thin portions are arranged substantially in an arc.

5. The rotor of a rotating electrical machine according to claim 1, wherein
the thin portions are arranged substantially in a chordal shape.

6. The rotor of a rotating electrical machine according to claim 1, wherein
the thin portions are arranged so as to have a plurality of random positions which are adjacent in a radial direction.

7. The rotor of a rotating electrical machine according to claim 1, wherein
an outward bent place is provided on the flange section on an outer circumferential side from the thin portion.

8. The rotor of a rotating electrical machine according to claim 3, wherein
the outer side of a side wall section of the insulation bobbin to be recessed are configured to have a slope at a boundary which becomes narrower to the bottom.

* * * * *